April 29, 1952  J. H. LANCOR, JR., ET AL  2,594,317
CORRECTED DATA TRACKING SYSTEM
Filed Nov. 21, 1942  6 Sheets-Sheet 4
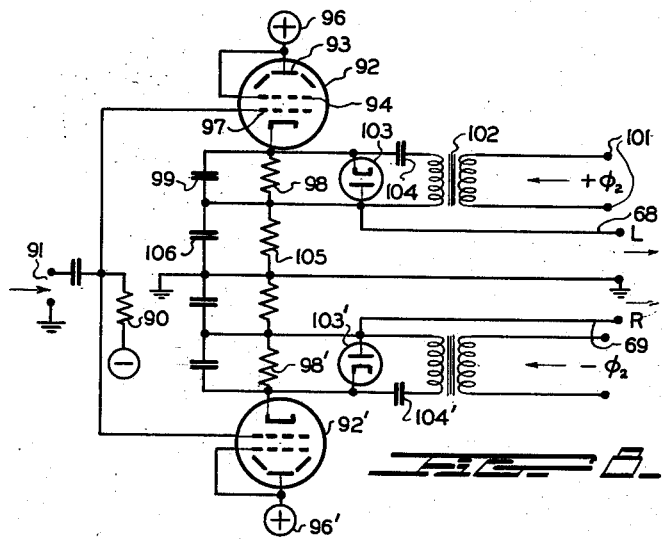
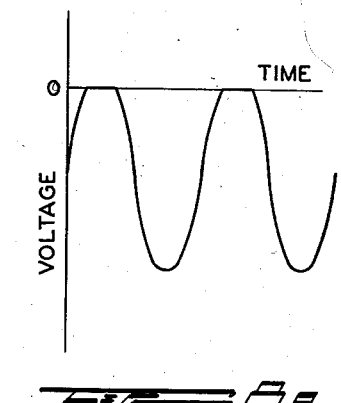
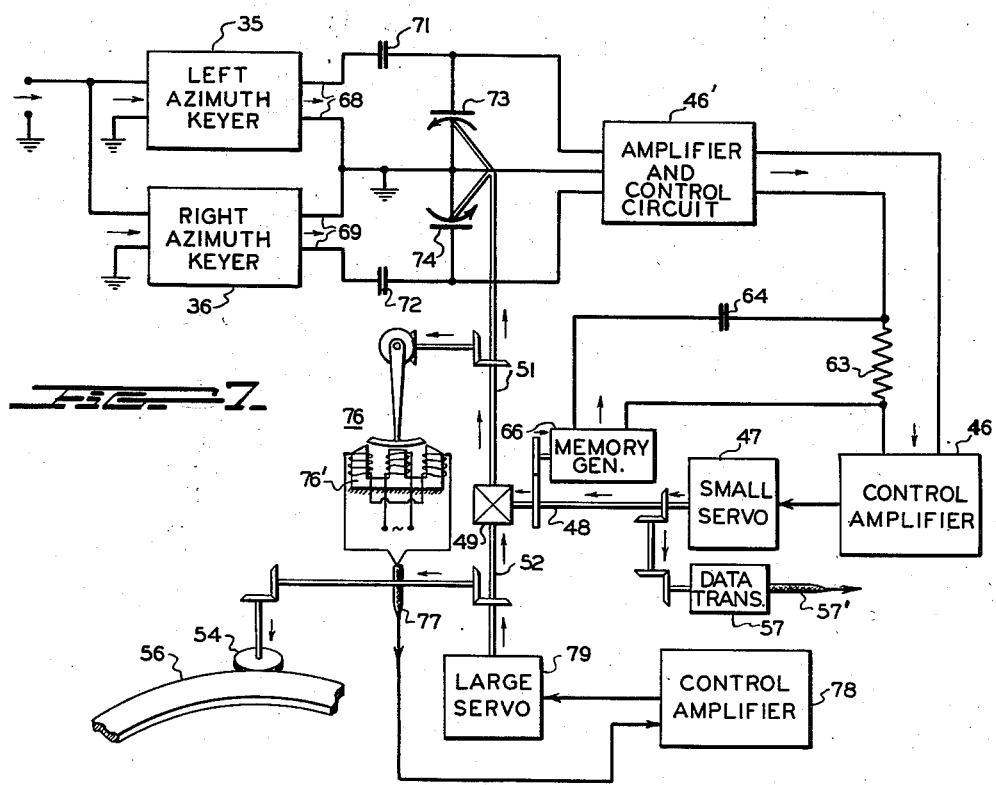
INVENTORS
JOSEPH H. LANCOR, JR
JOHN E. BINNS
BY
THEIR ATTORNEY April 29, 1952     J. H. LANCOR, JR., ET AL     2,594,317
CORRECTED DATA TRACKING SYSTEM
Filed Nov. 21, 1942     6 Sheets-Sheet 5
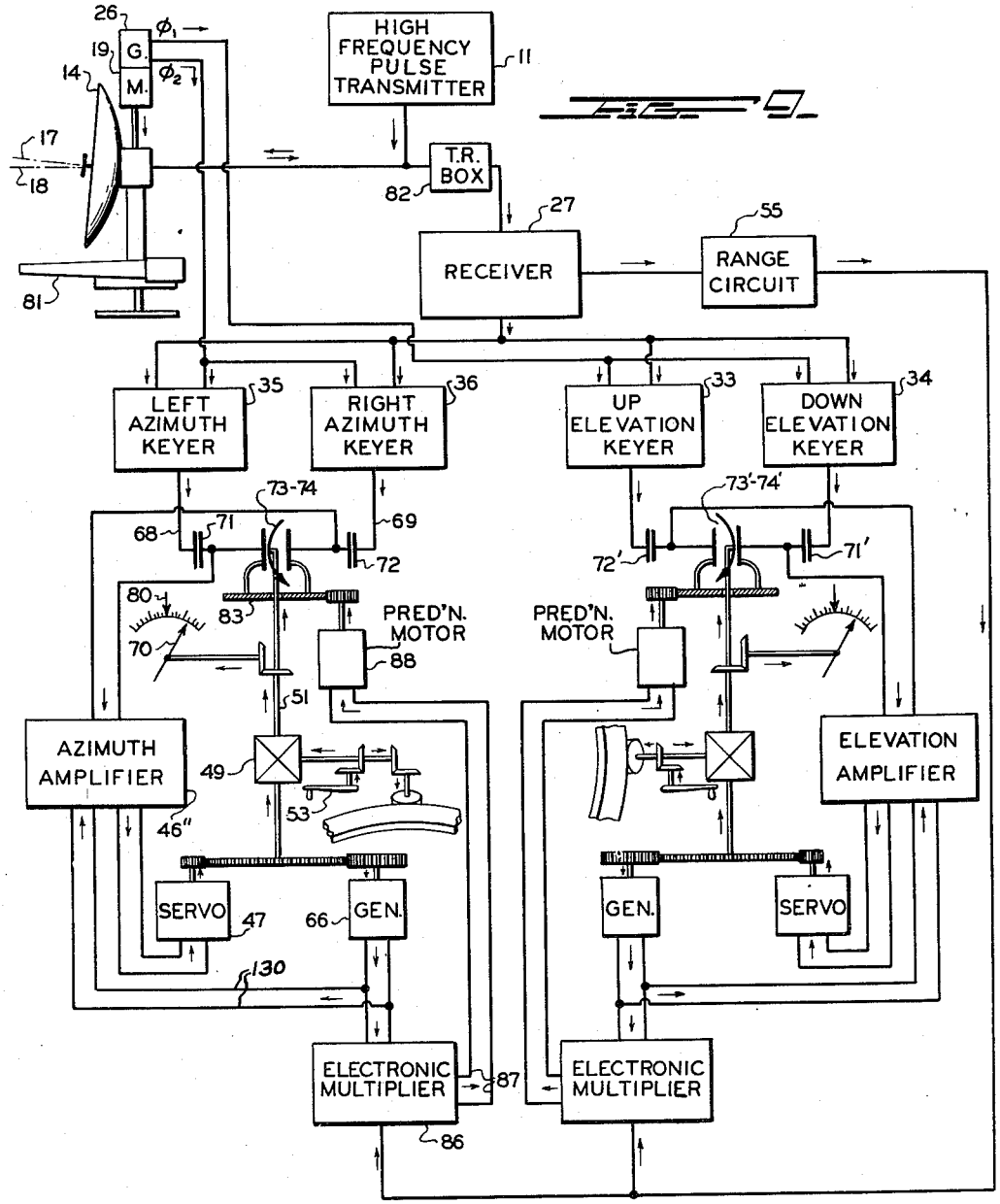
INVENTORS
JOSEPH H. LANCOR, JR
JOHN E. BINNS
BY
Paul B. Hunter
THEIR ATTORNEY

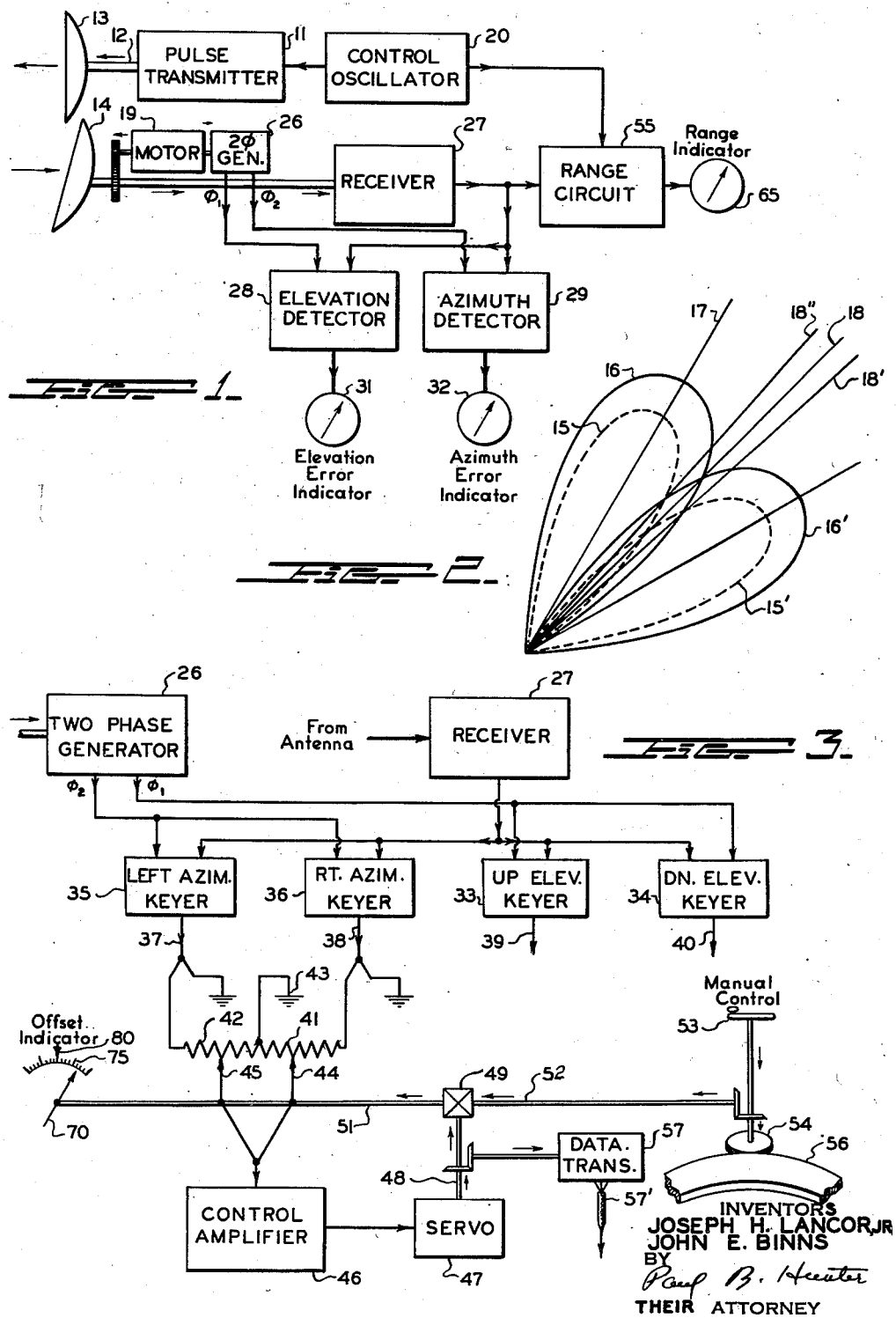

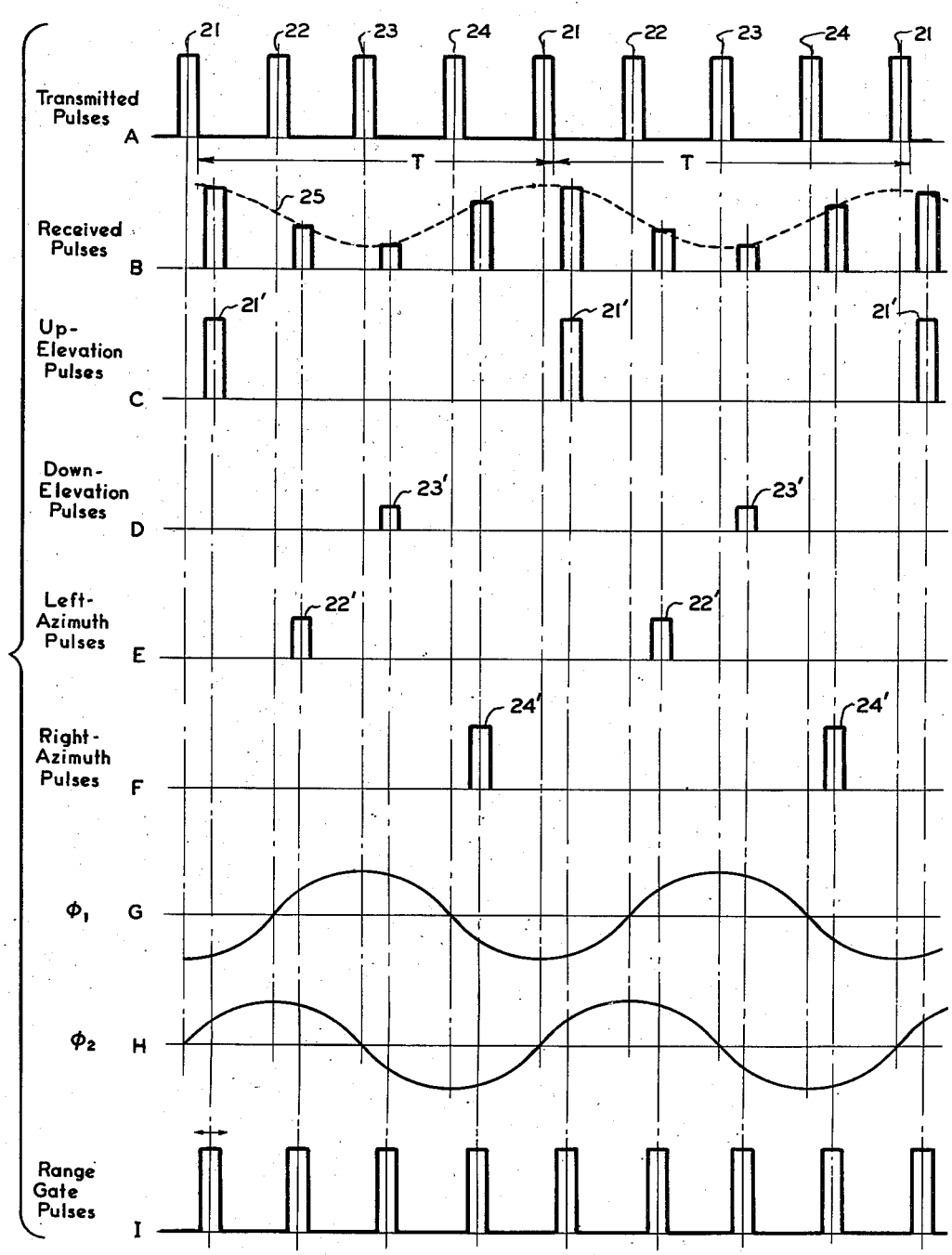

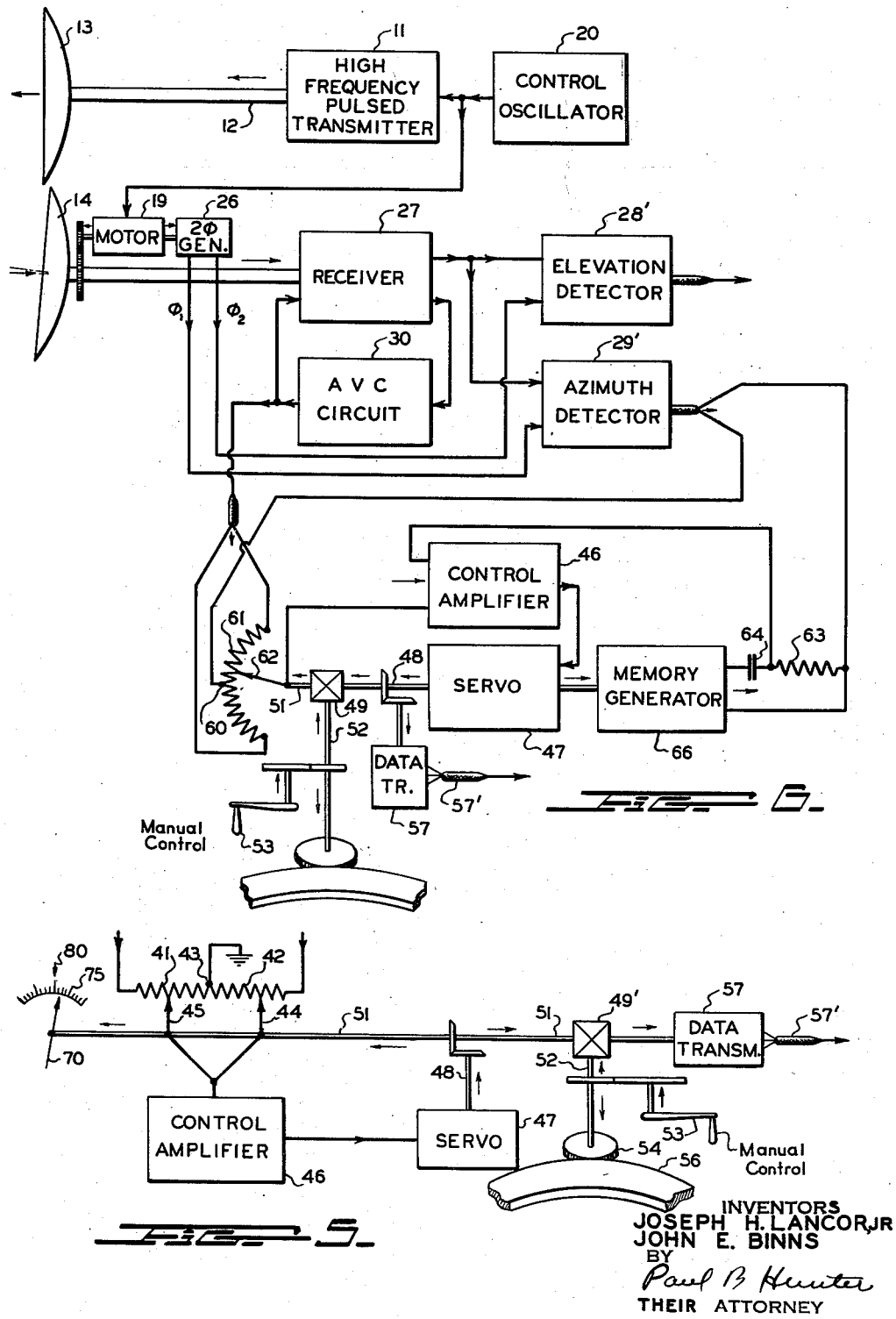

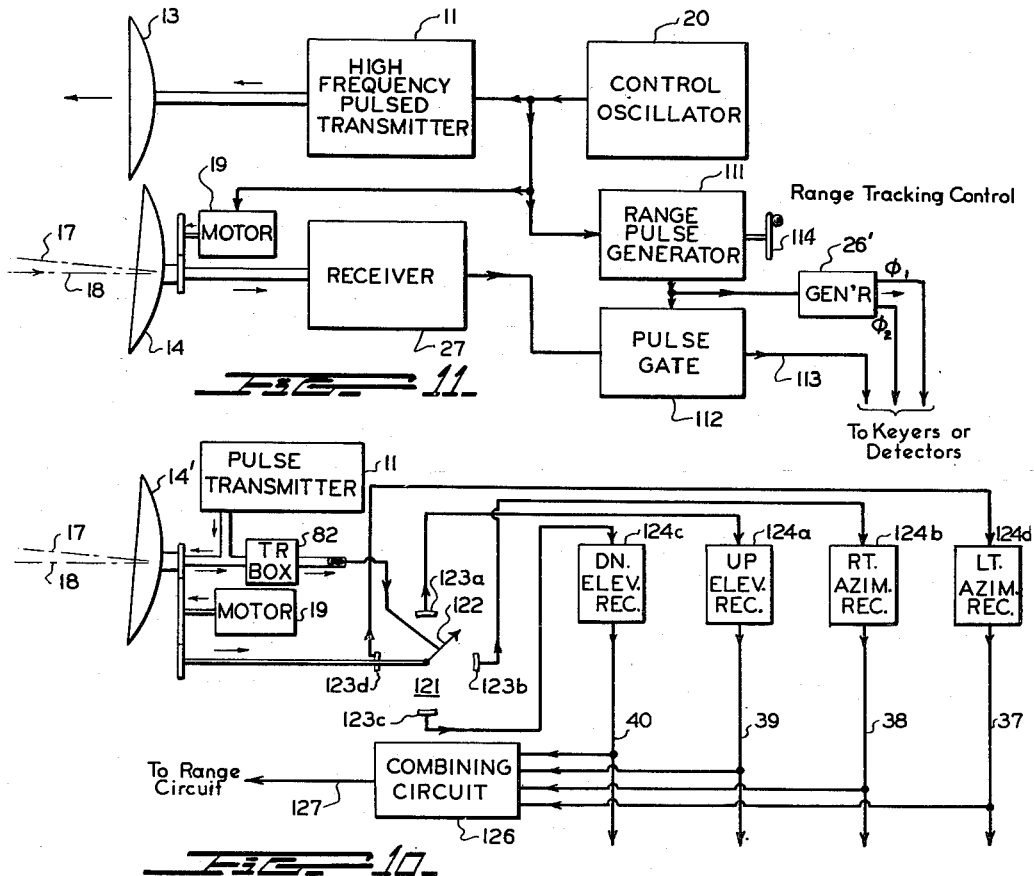

Patented Apr. 29, 1952

2,594,317

UNITED STATES PATENT OFFICE 2,594,317

CORRECTED DATA TRACKING SYSTEM

Joseph H. Lancor, Jr., East Williston, and John E. Binns, Floral Park, N. Y., assignors to The Sperry Corporation, a corporation of Delaware Application November 21, 1942, Serial No. 466,392

38 Claims. (Cl. 89—41)

The present invention is related to the art including radio tracking devices for determining the orientation and range of distant objects by radio means. Such devices are useful, for example, as object detectors and for indicating the orientation and range of, or distance to, a distant movable target for the purpose of accurately directing a searchlight or a gun, such as an anti-aircraft gun, thereat.

The present invention comprises an improvement over copending prior application Serial No. 452,818 for "Radio Tracking System" filed July 30, 1942 in the names of E. J. Isbister, H. M. Stearns, and W. N. Dean, which application matured into U. S. Patent No. 2,542,032 on February 20, 1951. In this prior copending application there is shown a tracking system in which the relative displacement between an orientable radio direction-determining apparatus and that of a distant movable object or target is indicated, whereby the radio apparatus may be caused to track with the distant target by orienting the apparatus to maintain this displacement at zero.

The present invention constitutes an improvement over this type of apparatus in that, at least for a limited range of such displacements, the radio apparatus may be caused to track electrically with the distant target without requiring actual physical rotation of the apparatus. This "electrical" tracking is preferably utilized in the present case to provide an automatic vernier adjustment for the mechanical tracking performed according to the prior application, so as to supply instantaneously correct information or data as to the orientation of the target, independently of any variations in the mechanical actuation of the device, such as may be encountered by reason of inability of the operator to track smoothly with the distant target. In addition, the present invention may be utilized effectively to determine the proper lead angle for a gun mounted together with the radio tracking apparatus, whereby a projectile may be properly directed toward the target.

Accordingly, it is an object of the present invention to provide improved object-locating means adapted to determine and track with the orientation of a distant object independently of small variations in the actuation of said tracking mechanism.

It is another object of the present invention to provide improved object orientation-determining and tracking mechanism in which random variations in the actuation of the mechanism, such as may be encountered by reason of inability of the operator to track smoothly, may be compensated for to produce a corrected output independent of said variations.

It is a further object of the present invention to provide an improved radio system for automatically actuating a member in accordance with the orientation of a distant object.

It is still another object of the present invention to provide improved radio object locating and orientation determining apparatus in which overlapping directivity patterns forming an equi-signal axis are provided, and wherein an output member is actuated in accordance with the ratio of the difference between the intensities of components of a radio wave reflected from a distant object and received in accordance with these respective patterns, to the sum of these activities, whereby this output member continuously indicates the orientation of the object.

It is a further object of the present invention to utilize the above principles in controlling a gun mounted together with the object orientation-determining apparatus and for inserting the required lead angle in the control of the gun, this lead angle being obtained by tracking with the target while angularly displaced from the equi-signal axis of the apparatus.

Other objects and advantages of this invention will become apparent as the description proceeds.

In the drawings,

Fig. 1 shows a schematic block circuit diagram of the device of the above-mentioned prior application, useful in explaining the type of apparatus toward which the present invention is directed.

Fig. 2 shows a longitudinal cross-section of the receptivity patterns of the present device and that of the above prior application.

Fig. 3 shows a schematic block circuit diagram of a portion of one form of the present invention.

Fig. 4 shows various voltage-time curves useful in explaining the operation of both the device of the prior application and the present invention.

Fig. 5 shows a block circuit diagram of a modification of a portion of the apparatus of Fig. 3.

Fig. 6 shows a block circuit diagram of a further modification of the invention.

Fig. 7 shows a schematic block circuit diagram of a further embodiment of the present invention incorporating automatic control of the tracking apparatus.

Fig. 8 shows a schematic circuit diagram of a keying device suitable for use with the circuit of Fig. 7 and also with that of Fig. 3.

Fig. 8A shows a voltage-time curve useful in explaining the operation of the apparatus of Fig. 8.

Fig. 9 shows a schematic block circuit diagram of an adaptation of the present invention to a computing radio gun sight.

Fig. 10 shows a schematic diagram of a modification of a portion of the preceding figures.

Fig. 11 shows a schematic diagram of a modification of another portion of the preceding figures.

Referring to Fig. 1, there is shown a schematic diagram of the system of the above prior copending application Serial No. 452,818, now U. S. Patent No. 2,542,032. This system comprises a high frequency radio transmitter 11 adapted to produce periodic pulses of high frequency energy, at a repetition rate determined by a control oscillator 20, which pulses are conducted by way of a suitable high frequency energy conductor 12 to a radiating device 13, indicated as being a parabolic reflector within which are positioned suitable elements for efficiently radiating the high frequency energy impressed thereon from transmitter 11. The energy thus transmitted from reflector 13 is preferably of a directive character, but extends over an appreciable solid angle, which may have an apex angle of the order of 15°. The wave envelope of this radiated energy will be as shown in Fig. 4 (curve A), comprising a periodic sequence of short pulses of high frequency energy, each pulse preferably being of very short duration, as of the order of 1 microsecond, but shown exaggeratedly in this figure. The periodicity or recurrence frequency of these pulses is preferably chosen to be in the audio frequency range, such as of the order of 400 to 2000 pulses per second.

These pulses of high frequency energy will then be reflected from any object or objects within the field of the radiation pattern of the transmitting arrangement 13, which objects act as a secondary source of this high frequency energy, so that this energy will be received by the receiving antenna 14, also shown as comprising a parabolic reflector containing a suitable radiant energy pick-up device at the center thereof. As described more in detail in the above copending application, receiving antenna arrangement 14 is made highly directive, having a receptivity pattern of the type exaggeratedly shown at 16 in Fig. 2, with a very narrow apex angle. In addition, the axis of symmetry 17 of this receptivity pattern 16 is rotated about an axis 18 off-set therefrom by a predetermined small angle, such as of the order of 2 to 4 degrees, by means of a motor 19 rotating certain elements of the antenna arrangement 14, as is described more in detail in the above copending application. Any suitable means for producing a rotating directivity pattern may be used here. In this prior application, the speed of rotation of pattern 16 does not necessarily bear any particular relationship to the periodicity of the high frequency pulses emitted by transmitter 11 and antenna 13, merely permitting a substantial number of pulses to be transmitted and received per revolution.

If the reflecting object were located along the spin axis 18, it will be seen that all the reflected pulses would be received with equal intensity. If the orientation of the reflecting object, however, is displaced from axis 18, the reflected pulses will be received with unequal intensity during each revolution. Such a condition is shown in Fig. 4 (curve B), in which the wave envelope 25 of the reflected pulses received by antenna 14 is shown for a reflecting object having an orientation offset from that of spin axis 18.

It will be seen that the amplitude of these received pulses will vary periodically at a frequency corresponding to the periodicity of rotation of the receptivity pattern 16, and, as explained in the above application, the phase of this wave envelope 25 with respect to the rotation of the pattern 16 provides an indication of the orientation of the target relative to that of spin axis 18. Accordingly, in the prior application, the wave received by receiving antenna 14 is conducted to a suitable receiver 27 which amplifies and demodulates the received wave, so that in its output there is produced the wave 25 shown in Fig. 4 (curve B). This wave is then compared with the two output voltages $\phi_1$ and $\phi_2$ of a two-phase generator 26 driven from the same motor 19 as the antenna 14, and having a frequency output of the same periodicity as the rotation of pattern 16. These comparisons are performed in respective elevation and azimuth phase detectors 28 and 29, which are adapted to produce respective outputs corresponding to the respective components of the envelope of wave 25 in phase with the respective reference voltages $\phi_1$ and $\phi_2$. These outputs then actuate suitable indicators 31 and 32 to indicate the elevation and azimuth components of the relative displacement between the target or object orientation and that of spin axis 18.

The ouputs of receiver 27 and of oscillator 20 are also fed to a range circuit 55 described in the above application, adapted to produce a voltage corresponding to the distance or range of the reflecting object, which voltage is indicated by a suitable range indicator 65.

In operating the apparatus of the above application, the spin axis 18 of the receiving antenna 14 is oriented by suitable manual or power controls to maintain the indications of the elevation and azimuth displacement indicators 31, 32 at zero. When this condition obtains, the orientation of the apparatus corresponds to that of the target, and may be suitably utilized to indicate the orientation of the distant object or to control suitable orientable devices, such as searchlights, guns, gun-directors, etc., toward the distant object.

Difficulty is often experienced in maintaining the indicators 31, 32 at zero, due to the psychological inertia of the operators and to possible difficulties in physically controlling the orientation of the apparatus. As a result, the orientation data or indication derived from the apparatus of the prior application has been susceptible to fluctuations and variations, which are extremely undesirabe, especially when continuously accurate indications of the orientation of the distant object are required as with computing directors or gun sights. In order to correct for these fluctuations recourse is had to the present invention, which may be termed a "corrected data" system. This system is generally similar to that shown in Fig. 1 with the differences to be described.

In the present case the speed of rotation of motor 19 is preferably, although not necessarily, chosen to have a definite relation to the periodicity of the pulses derived from transmitter 11, preferably such that four pulses of high frequency radiant energy are emitted from the transmitting antenna 13 during each revolution of the receptivity pattern 16. It will be clear that if the phase of these pulses relative to the rotation of motor 19 and receptivity pattern 16 is properly adjusted, one pulse of high frequency energy will be emitted at the instant that receptivity pattern 16 has its highest elevation, which will be designated as the "up elevation" pulse. This might correspond, for example, to pulses 21 of Fig. 4 (curve A). A quarter of a revolution later, that is when the receptivity pattern is, for example, at its left-most position in azimuth, another pulse will be emitted by transmitter antenna 13, which may be designated as the "left azimuth" pulse, shown at 22 in Fig. 4 (curve A). The next pulse to be transmitted will be emitted at the instant that the receptivity pattern 16 has its lowest position in elevation and may be termed a "down elevation" pulse, such as 23 in Fig. 4 (curve A), and the following pulse will be issued at the instant that the receptivity pattern 16 has its right-most position in azimuth and may be termed the "right azimuth" pulse 24 of Fig. 4 (curve A). This sequence of pulses will be successively repeated thereafter.

The pulses thus transmitted will be reflected from any reflecting object or target within the radiation pattern of the transmitting antenna 13 and the reflected pulses will be picked up by the receiving antenna arrangement 14. Fig. 2 shows in exaggerated form the receptivity pattern of the receiving arrangement 14, which is identical with that of the prior application described above. Since the pulses of the pair of elevation pulses and of the pair of azimuth pulses are transmitted at instants when the receptivity pattern 16 assumes diametrically opposed positions in its rotation, Fig. 2 can be considered to represent the receptivity pattern for either both for the elevation pulses or both of the azimuth pulses. Thus pattern 16 may represent the position of the receptivity pattern at the instant the left azimuth pulses or the up elevation pulses are transmitted, and position 16' may correspond to transmission of the other pulses of each pair. For illustrative purposes, it will be assumed that Fig. 2 represents the pattern positions for the azimuth pulses.

If the reflecting object is located along the spin axis 18, it will be seen that the reflected azimuth pulses must then be received with equal intensity. If the orientation of the reflecting object is displaced from spin axis 18, for example, in position 18', it will be seen that the reflected right azimuth pulse will be received with higher amplitude than the reflected left azimuth pulse. This condition is illustrated in Figs. 4 (curve E) and 4 (curve F), which show the respective reflected left and right azimuth pulses 22' and 24'. Correspondingly, if the object orientation is at 18'', the left azimuth pulse will be received with higher intensity than the right azimuth pulses. The same reasoning applies to the elevation pulses and, as in the illustration shown in Fig. 4 (curves C and D), the reflected up elevation pulses 21' may have higher intensity than the reflected down elevation pulses 23'.

Accordingly, a comparison of the reflected left azimuth pulses 22' of Fig. 4 (curve E) with the reflected azimuth pulses 24' of Fig. 4 (curve F) will yield an indication of the relative displacement in azimuth between the target orientation and that of spin axis 18. In a similar way, a comparison of the up elevation pulses 21' of Fig. 4 (curve C) with the down elevation pulses 23' of Fig. 4 (curve D) will give an indication of the relative displacement in elevation between the target orientation and the spin axis 18.

Fig. 3 shows a partial circuit diagram for utilizing the principles just discussed. This figure shows only that portion of the device which is pertinent to the present discussion, it being understood that the transmitting and receiving arrangement is the same as in Fig. 1.

In order to separate the various pulses shown in Fig. 4 (curves C, D, E and F) from the entire received wave shown in Fig. 4 (curve B), two-phase generator 26 is suitably coupled to motor 19 and is rotated synchronously with the rotation of the receptivity pattern 16, as already described. Preferably this generator will produce a pair of alternating voltages displaced in phase by 90° and whose periodicity is the same as that of the rotation of the receptivity pattern 16. The respective received pulses are separated as shown in Fig. 3 by means of respective keying devices 33, 34, 35 and 36 which are adapted to transmit to their outputs only the respective up elevation, down elevation, left azimuth and right azimuth pulses shown in Fig. 4 (curves C to F). In the present instance this is done by suitably comparing the two-phase reference voltages $\phi_1$ and $\phi_2$ shown in Fig. 4 (curves G and H) with the receive wave 25.

Thus it will be seen that the reference wave $\phi_1$ shown in Fig. 4 (curve G) will attain its maximum negative values at the same instants that the up elevation pulses 21 are transmitted, and will attain its maximum positive values at the same instants that the down elevation pulses 23 are transmitted. Accordingly, keyers 33 and 34 are so designed as to be completely blocked during most of the cycle of operations and to be conductive, or in transmitting condition, only during the positive maximum and negative maximum instants respectively, of the reference wave $\phi_1$, whereby in their outputs will appear only the up elevation and down elevation pulses, respectively. A suitable form of keyer is shown in Fig. 8, although other forms may be used.

Similarly the reference wave $\phi_2$ shown in Fig. 4 (curve H) attains its maximum positive values at the same instants that the left azimuth pulses 22 are transmitted and its maximum negative values at the same instants that the right azimuth pulses 24 are transmitted. The similar keyers 35 and 36 are therefore controlled in any suitable manner by the reference wave $\phi_2$ so as to transmit to their outputs 37 and 38 only the left azimuth and right azimuth pulses respectively.

Although the reference voltages $\phi_1$ and $\phi_2$ are synchronized with the transmitted pulses, as just described, it will be clear that they will bear substantially the same relations to the received pulses, which are only slightly delayed in phase with respect to the transmitted pulses.

In the circuit of Fig. 3 there is shown only the control with respect to one coordinate, such as the azimuth coordinate. It should be understood, however, that a similar control system is utilized along the other or elevation coordinate, controlled from the outputs 39 and 40 of the respective elevation keyers 33 and 34. Instead of directly comparing the amplitudes of these right and left pulses to give an indication of the relative displacement or target error, as may be done, the present case preferably utilizes these pulses to automatically correct the electrical characteristics of the system, and, by so doing, to determine the relative deviation between the target orientation and that of the spin axis 18. Thus it has been determined that an effective linearly varying shift of the spin axis 18, within narrow limits of the order of 6° to either side of the actual physical orientation of the spin axis 18, can be obtained by differentially varying the receptivity sensitivities of the circuit for the two oppositely located positions of the receptivity pattern, such as 16 and 16'. Thus, if the sensitivity of the entire device to the two azimuth pulses is differentially varied, so that the circuit is more sensitive to left azimuth than to right azimuth pulses, the effect is the same as though the receptivity pattern 16' were changed to the dotted position 15', and the circuit sensitivities remained unbalanced. In such a case, equality of the received pulses would correspond to a target orientation along axis 18' instead of axis 18. Alternatively, it can be considered that patterns 16 and 16' represent the combined antenna and circuit space sensitivity patterns.

If, on the other hand, the sensitivity of the circuit to the left azimuth pulses is decreased, it is equivalent to changing the receptivity pattern 16 to a position 15, and now equal indicated amplitudes of the received pulses would indicate a target orientation along 18''. Thus, it will be seen that change in relative sensitivity of the circuit to the two pulses varies the effective position of the spin axis, with respect to its physical position 18, between limits such as 18' and 18''. This effective position may be termed the equi-signal axis, it being understood that the equal signals are not the actually received radiant energy signals, but their counterparts in a latter portion of the system, as will be described.

It has been determined that the angular variation of the equi-signal axis with change in relative circuit sensitivity is a substantially linear relation within predetermined limits, which may be of the order of magnitude of 6° on either side of the actual physical orientation of the spin axis 18.

This principle is utilized in the present device, in which the operator attempts to maintain the physical spin axis 18 directed toward the target. Any relative displacement between the spin axis 18 and the target orientation, due to inability to maintain accurate tracking, is then compensated for by automatically adjusting the sensitivity of the circuit to the two pulses received during opposite positions of the receptivity pattern 16, so as to automatically maintain the effective spin axis, or over-all equi-signal axis, directed toward the target. The operator therefore need only the track with the target within the range of linear variation of the effective spin axis, that is within 6° of the actual target orientation in the illustrative example given, to yield an accurate indication of the target orientations.

The purpose of tracking with the target, of course, is to determine the actual target orientation, such as for the purpose of indicating this orientation or for directing a searchlight or a gun at the target. In the present invention the target orientation is utilized to actuate a remote data transmitter, such as of the usual self-synchronous or "Selsyn" type, which may transmit data corresponding to the true target orientation to a remote point for utilization at that point. Of course, the data transmitter may be replaced by any suitable indicator. This data transmitter in the present invention is actuated, firstly, by a manual control under the control of the operator, and secondly, automatically in accordance with the variation of relative circuit sensitivities just discussed. The apparatus for performing this function is shown in Fig. 3.

Thus, the outputs 37 and 38 of azimuth keyers 35 and 36, respectively bearing voltages corresponding to the waves of Fig. 4 (curves E and F), are supplied to respective potentiometers 41 and 42 having a common terminal grounded at 43. Cooperating with these potentiometers 41 and 42 are respective sliders 44 and 45 having a fixed relative spacing. Assuming for the moment that equal average voltages are applied to the respective potentiometers 41 and 42 from outputs 37 and 38, it will be seen that when sliders 44 and 45 are symmetrically disposed there will be zero average voltage between them. This may be considered a neutral or datum position. If the voltages applied to potentiometers 41 and 42 from outputs 37 and 38 differ, sliders 44 and 45 must be asymmetrically disposed in order to have zero voltage therebetween, and the amount of displacement of these sliders 44 and 45 from their symmetrical position will be proportional to the ratio of the difference in amplitudes of the voltages derived from outputs 37 and 38 to the sum of these amplitudes; that is, to what may be termed the "percentage modulation" of the left and right azimuth pulses.

If the output of the apparatus thus far described is considered to be the voltage between each of the sliders 44 and 45 and ground 43, it will be seen that motion of the slider 44 effectively varies the sensitivity of the apparatus to the right azimuth pulses and may be considered to vary the receptivity pattern 16' as already discussed. Motion of slider 45 similarly can be considered to simultaneously and oppositely vary the sensitivity of the apparatus to the left azimuth pulses, or to vary the size of the receptivity pattern 16.

The displacement of sliders 44, 45 from the datum position has been found to be proportionally related to the angular variation of the equi-signal axis, within a predetermined range, and this is utilized as will be described. For this purpose, the voltage difference appearing across sliders 44, 45 is supplied to a balanced control amplifier 46, of any suitable type, to control a servo-mechanism 47 of any suitable type, whose output shaft 48 operates through a differential 49 to position a shaft 51 coupled to sliders 44, 45. Amplifier 46 preferably includes any necessary anti-hunt and anti-lag circuits of well-known type, required to provide accurate and sensitive control of servo 47.

The second input 52 to differential 49 is directly coupled to a manual control 53 which actuates a pinion 54 engaging a rack 56 which is fixed with respect to ground. The entire apparatus thus far described is mounted on a suitable rotatable platform (not shown) and is rotated in azimuth by actuation of the manual control 53. Accordingly, the angular position of shaft 52 corresponds to the orientation of the mount or spin axis 18 in azimuth, so that element 52 of differential 49 is determined in position by the orientation of the spin axis 18. Actuation of the manual control 53 causes the entire apparatus to walk around rack 56 and thus determines the actual orientation of the spin axis 18 in azimuth.

The servo 47 operates to position sliders 44 and 45 to such a position that zero voltage exists therebetween. As discussed above, the angular displacement of shaft 51 to produce this condition is proportional to the angular variation between the spin axis 18 and equi-signal axis, or to the relative displacement or error between the target orientation and the spin axis 18.

Member 48 of differential 49 is thereby positioned in accordance with the sum of the angular displacements of the shafts 51 and 52. Since shaft 52 represents the orientation of the spin axis 18 with respect to the ground, and shaft 51 represents the angular displacement between the target orientation and that of axis 18, it will be seen that the angular position of shaft 48 represents the orientation of the target with respect to ground. Accordingly, by coupling the target orientation data transmitter 57 to shaft 48, the data transmitted over leads 57' to the remote point will represent the true target orientation. It will be clear that data transmitter 57 may be replaced by a suitable orientation indicator, if desired.

In operation, the tracking operator will actuate control 53 to attempt to maintain a pointer 70, which is fixed to sliders 44, 45, centered on an index 80 formed as part of a scale 75. When pointer 70 is in register with index 80, sliders 44, 45 are symmetrically disposed with respect to potentiometer 41, and the sensitivities of the two channels are equal, so that the equi-signal axis and the spin axis 18 are coincident. The amount sliders 44, 45 are displaced from this point, shown by the displacement between pointer 70 and index 80, indicates the offset between spin axis 18 and the target orientation, which is the tracking error and may be read on scale 75. However, transmitter 57 will still transmit accurate and correct data even though pointer 70 is not kept smoothly coincident with index 80 at all times, as will appear from the following considerations.

If the target orientation should vary, as by motion of the target within the 6° variation from spin axis 18, the data transmitter 57 will correspondingly vary, even if manual control 53 is not actuated, since the change in target orientation will produce a change in the voltage across sliders 44 and 45, thereby causing the servo 47 to rotate shaft 51 to reposition sliders 44, 45 back to their zero voltage position. By so doing shaft 48 rotates by the same amount as the target orientation has been displaced, so that the data transmitted by transmitter 57 represents the correct target orientation at all times without regard to the actuation of manual control 53.

Also, if the target is assumed to be fixed in orientation, and manual control 53 is erratically actuated, such actuation tends to displace sliders 44, 45 from their zero voltage position by the mechanical connection between control 53 and sliders 44, 45. At the same time, such actuation of control 53 moves the spin axis 18 and thereby changes the relative intensities of the reflected azimuth pulses. The system is so adjusted that the effect of the change in position of sliders 44, 45 is exactly counter-balanced by the change in the voltages impressed upon potentiometers 41 and 42, so that the voltage across sliders 44, 45 remains zero, maintaining shaft 48 stationary, so that the data transmitted from transmitter 57 will still be the correct orientation data despite the motion of the manual control 53. Thus, it will be seen that within the range of control of the system, correct target orientation data will be transmitted independent of any actuation or lack of actuation of manual control 53, so long as the range of control (that is, the 6° variation illustratively discussed above) is not exceeded. In this manner, an discrepancy in the positioning of manual control 53 is automatically curred or corrected by the data correcting system of Fig. 3 constituting the present invention. The transmitted data may thus be termed "corrected data."

It is to be understood that a similar circuit and control arrangement is provided for control along the elevation coordinate under the control of the outputs of the up and down elevation keyers 33 and 34.

It will be seen that the present system offers the great advantage that it is substantially independent of fading of the radio signal, which changes the difference between the pulse intensities to which prior art systems have been responsive, even without a change in target position. By the present system, control is responsive to $$\frac{P_1-P_2}{P_1+P_2}=\frac{\frac{P_1}{P_2}-1}{\frac{P_1}{P_2}+1}$$

where $P_1$, $P_2$ represent the respective pulse intensities. Here the governing factor is the ratio $P_1/P_2$, which does not change with fading of the signal.

Fig. 5 shows a modification of a portion of the device of Fig. 3, applicable either to the azimuth control or the elevation control. In this instance, servo 47 operates to directly reposition the sliders 44 and 45 of potentiometer 41 and at the same time actuates one input member 51 of differential 49'. A second member 52 of differential 49' is controlled by manual control 53 in a fashion similar to that of Fig. 3, while the data transmitter 57 is now actuated by the third or output member of differential 49'. In this case, servo 47, instead of rotating in correspondence with the true target orientation as in Fig. 3, now is positioned merely in accordance with the amount of offset or error between the equi-signal line (18', for example,) and the actual spin axis 18.

The data transmitter 57 is here actuated in accordance with the sum of the displacement produced by manual control 53, which represents the angular displacement of the spin axis 18 from a predetermined azimuth datum orientation, and the angular displacement of shaft 51, representing the angular deviation or error between the equi-signal axis or target orientation and that of spin axis 18, whereby data transmitter 57 is actuated solely in accordance with the actual target orientation, independent of any variations of the manual control 53, within the limits of the system.

Here again, if the target should be moving while manual control 53 is stationary, for example, the change in the relative amplitudes of the left and right azimuth pulses will cause a change in the voltage between sliders 44 and 45, whereby servo 47 is actuated to reposition sliders 44, 45 to a position where zero voltage appears therebetween. In so doing, servo 47 operates through differential 49' to reposition data transmitter 57 in accordance with the motion of the target, whereby the data thereby transmitted represents true target orientation data at all times.

Also, if the target should be fixed and manual control 53 be actuated, it will be seen that the resultant motion of spin axis 18 will produce a change in the voltage across sliders 44, 45, and will thereby actuate servo 47 to reposition shaft 51 and sliders 44, 45 to a position of zero voltage. By so doing, the motion of shaft 51 effectively wipes out that of shaft 52, and as a result the data transmitter 57 remains stationary, which is the desired condition since the target has been assumed to be stationary.

Hence, it will be clear that, so long as the limits of operation of the device are not exceeded, the data transmitted by data transmitter 57 are substantially independent of the manual control 53 and hence are independent of any variations in the operation of the particular gunner.

The system of Fig. 3 or Fig. 5 offers the great advantage in that the servo 47 in either case may be made very small and of low power, since the only work it must perform is to reposition sliders 44, 45 and to insert motion into the differential 49 or 49' to operate data transmitter 57. Such servos can be made very accurate and close following, without lag or hunting. The actual large power load formed by the relatively high inertia mount supporting the apparatus of the invention is supplied by the manual control 53, which, of course, may be replaced by any suitable manually-controlled power servo.

The net result of the present system is the same as though a completely automatic tracking system were provided, in which the signals produced across sliders 44, 45 serve to position the entire mount and to maintain the mount in automatic track with the target, but without requiring the high power and extremely accurate servo which would otherwise be required, and which in practice has been found to be difficult, if not impossible, of attainment.

Fig. 6 shows another type of circuit operating upon the same principle as those of the preceding figures, showing control in detail along one coordinate only, it being understood that the other coordinate has a similar control system. Here again, the high frequency transmitter 11 emits a wave of radiant energy comprising a recurring sequence of periodic pulses whose periodicity is controlled in accordance with the frequency of control oscillator 20. The receiving antenna arrangement 14 is again spun by motor 19, which is synchronized in speed with respect to the periodicity of the transmitted pulses by its connection to control oscillator 20. Thus, motor 19 may be some form of synchronous motor which, with suitable gearing, will provide the proper relationship between the periodicity of the transmitted pulses and that of the rotation of antenna 14.

Receiver 27 is provided with an automatic volume control circuit 30 whereby the average amplitude of its output is maintained substantially constant. Such AVC circuits are well known in the art and are not believed to require specific description here. As is well known, the control voltage derived from the AVC circuit 30 and utilized to control the output of receiver 27 is substantially proportional to the average amplitude of the wave input to receiver 27. In the present embodiment of the invention, this voltage is applied across a potentiometer 61 whose output voltage taken between center tap 60 and arm 62 is connected in series with the output of detector 29'. Detector 29' is energized from receiver 27 and from one of the two-phase voltages output from generator 26, and is selected to be of the well-known type which produces an output uni-directional voltage having a magnitude and polarity corresponding to the difference between the right and left azimuth pulses discussed above. The series voltage thus obtained from the outputs of detector 29' and potentiometer 61 is further connected in series with a voltage appearing across a resistor 63, which is connected in series with a condenser 64 across a "memory" generator 66 whose function will be described.

If desired, the voltage impressed across potentiometer 61 may be obtained by rectifying the output of receiver 27, or in any other manner, so long as its magnitude corresponds to the average received pulse intensity. If the average pulse intensity inherently remains constant, potentiometer 61 may be connected to a source of constant voltage.

The resultant voltage thus produced, having three components, namely, (1) the voltage between the variable arm 62 and center-tap 60 of potentiometer 61, (2) the voltage output from azimuth detector 29' and (3) the voltage across resistor 63, is supplied to the amplifier and control circuit 46 whose output actuates the servo 47 so long as the voltage input to amplifier 46 departs from zero. Servo 47 is directly connected to generator 66 and also to one member of differential 49, a second member of which is actuated from shaft 52 by means of the manual control 53, similar to the arrangement in Fig. 3. Servo 47 is also directly connected to the data transmitter 57 or other indicator, as in Fig. 3. The third member 51 of differential 49 actuates the variable arm 62 of potentiometer 61.

Neglecting for the moment the effect of the voltage across resistor 63, servo 47 continuously positions potentiometer arm 62 so that the voltage produced by potentiometer 61 will be equal and opposite to that derived from detector 29'.

The voltage output from detector 29' is proportional, as just discussed, to the difference between the amplitudes of the respective left and right azimuth pulses. The voltage impressed on potentiometer 61 is proportional to the sum of these amplitudes. Accordingly, the angular displacement of arm 62 necessary to produce the balanced condition described must be proportional to the ratio of the difference in the pulse amplitudes to the sum of the pulse amplitudes. This, as indicated above, has been found to be substantially linearly proportional to the angular variation of the target orientation with respect to the orientation of the mount, within predetermined limits, such as of the order of 6°. Accordingly, the rotation of shaft 51 controlling arm 62 will be proportional to the displacement of the target orientation from that of the mount. Since the mount orientation proportionately sets shaft 52, it will be seen that shaft 48, which is controlled in accordance with the sum of the displacements of shafts 51 and 52, will be displaced in accordance with the true target orientation, determined with respect to a predetermined datum orientation. Since the data transmitter 57 is directly coupled to shaft 48, the mount orientation data derived from manual control 53 is "corrected" in accordance with the actual target orientation so that the data transmitted by transmitter 57 is accurately the target orientation, similar to Fig. 3. The arrangement of Fig. 5 may be used here if desired.

Generator 66 provides a unidirectional voltage output which is substantially proportional to the angular velocity at which it is rotated, namely, proportional to the angular velocity of servo 47, corresponding to the rate of change of the corrected target orientation. The circuit comprising resistance 63 and condenser 64 is chosen to have a fairly low time constant, so that the voltage across condenser 64 will at all times be substantially equal to that produced by generator 66, and only a slight voltage will appear across resistor 63.

If, for any reason, while the target is being tracked, the signal output from detector 29' should fail as, for example, due to atmospheric conditions or to a change in received signal intensity to a value below the threshold value of operation of receiver 27, the voltage input to amplifier 46 would suddenly be changed, and servo 47 would tend to slow down. In so doing, however, condenser 64 would discharge through resistor 63 and generator 66, and the voltage thereby produced across resistor 63 would effectively replace that from detector 29', and would serve to maintain the servo 47 and transmitter 57 operating at a substantially constant rate for a short period of time. In this manner, any brief failure of the received signal would have no effect on the operation of the system, which would tend to follow the target at the same rate existing just before the signal failure. Hence, a type of "memory" is provided for the system, which permits the system to overlook or ignore brief failures of the signal. The system may be adjusted to the signal level at which the "memory" becomes effective by a suitable cut-off bias in receiver 27.

Generator 66 may also be employed to reduce hunting or lag of servo 47 by the introduction of its velocity-responsive voltage, in well-known manner. This function may be replaced by suitable dampers if desired.

Fig. 7 shows control along one coordinate for still another embodiment of the invention, it being understood that the transmitting and receiving arrangement of Fig. 1 or 6 is used therewith. In this case, the received wave derived from receiver 27 is supplied to azimuth keyers 35 and 36 which pass only the pulses corresponding to right and left azimuth to their respective outputs 68 and 69. These respective right and left pulses are then fed to respective capacitive-type variable voltage dividers 71, 73 and 72, 74 each comprising a variable condenser 73 or 74 and a fixed condenser 71 or 72 in series. Variable condensers 73 and 74 are so coupled together that their capacitances are simultaneously varied in opposite senses, in a fashion to maintain the sum of these capacitances constant.

It can be shown that, with such capacitive potentiometers or voltage dividers, the angular displacement necessary to produce equality of output to amplifier 46' is proportional to the ratio of the difference of the amplitudes of the input pulses from 68, 69 to the sum of these amplitudes so that this system has all the advantages of the prior systems, with the additional advantage that no rubbing or sliding contacts are required, permitting smoother and easier operation.

Preferably, condensers 71, 72 are made adjustable, and are adjusted so as to give the required proportionality between the variation in the orientation of the equi-signal line and the "percentage modulation" of the reflected pulses defined above.

The voltages derived across variable condensers 73, 74 are impressed upon the respective channels of a balanced amplifier and control circuit 46' adapted to produce in its output a reversible-polarity variable-magnitude unidirectional voltage corresponding in polarity and magnitude to the sense and magnitude of the difference in the amplitudes of the respective input voltages derived across condensers 73, 74. This produced voltage, appearing as the output of amplifier 46', is then connected in series with that across a resistor 63, similar to that of Fig. 6, and the resultant voltage is fed to an amplifier and control circuit 46 the output voltage signal of which operates the servo 47 whose output shaft 48 is connected to differential 49 in the same manner as in Fig. 3. The output 51 of differential 49 is connected to reposition the condenser assembly 73, 74 similar to the arrangement of Fig. 3. Servo 47 also actuates the "memory" generator 66 whose output is connected through condenser 64 to resistor 63. It will be clear that generator 66 and resistor 63 and condenser 64 provide a memory circuit of the same type described with respect to Fig. 6.

If desired, amplifier 46' may yield a reversible-phase variable magnitude voltage output, in which case the output of generator 66 is converted to a similar voltage by a suitable modulator, before being combined therewith in the input of amplifier 46.

In the present embodiment of the invention, manual control 53 is replaced by a suitable servo control. For this purpose, a pick-off 76 is provided having one portion coupled to shaft 51 and a cooperating portion 76' fixed to the mount, to produce in its output 77 a signal corresponding to the displacement of shaft 51, representing the tracking error between the true target orientation and that of the mount supporting the entire apparaus. Pick-off 76 may, for example, be of the well-known inductive three-legged transformer type, or any other suitable device. This signal, of course, represents the error between the target orientation, as determined by the corrected data system, and the spin axis 18. The signal thus produced is supplied to a control amplifier 78 and thence to a large servo 79, which replaces manual control 53, being connected to the input 52 of differential 49 and also to the pinion 54 driving the entire apparatus by its engagement with a fixed circular rack or gear 56.

The operation of the present system is exactly the same as that of Fig. 3 with the exception that the manual control 53 is replaced by the large servo 79, which operates in response to any displacement of shaft 51 and condensers 73, 74, which in turn is controlled by motion of the target by means of the various circuits already described, so that a fully automatic corrected data tracking system is provided.

The great advantage of the present system is that the servo 79 need not be highly accurate, but may be made quite simple in operation, since it need position the spin axis 18 only within the 6° leeway of the illustrative example used above. The small servo 47 of course may be readily made highly accurate without difficulty.

In this way, an entirely automatic tracking system is provided in which the data produced by data transmitter 57 will always accurately represent the true target orientation so long as the mount and apparatus are tracking with the target by means of the large servo 79, within the limits of accurate linear operation of servo 47. The use of large power, close-following and accurate servos, formerly required for automatic tracking is thus entirely avoided in the present system.

It will be clear that the automatic tracking feature of Fig. 7 could also be applied to Figs. 3, 5 or 6. Also, the capacitive voltage divider arrangement of Fig. 7 could be used in place of that of Fig. 3 or Fig. 5.

Fig. 8 shows the circuit of a pair of keyers or keying devices suitable for use as keyers 35 and 36 of Fig. 3 or Fig. 7. Thus, keying device 35 may comprise an amplifier tube 92 whose anode 93 and screen grid 94 are connected directly to a suitable source of positive potential 96. Control grid 97 has impressed thereon the received wave voltage, such as that of Fig. 4 (curve B), which is connected thereto by means of terminals 91. A cut-off bias is applied from a suitable negative voltage source through grid resistor 99. Connected in the cathode circuit of tube 92 is a resistor 98 having by-pass condenser 99. The reference voltage $\phi_2$ derived from generator 26 is connected through a suitable transformer 102 and then to a diode 103 by way of a blocking condenser 104. Diode 103 is then connected across resistor 98. The voltage across resistor 98 therefore will be the voltage $\phi_2$ modified by the action of the diode 103, which serves to clip a part of the positive half cycles of voltage $\phi_2$ to provide a flat-top or constant biasing voltage for tube 92 during a small part of each cycle of voltage $\phi_2$, near a maximum thereof as shown in Fig. 8A. As will be seen, this flat-top portion permits the slight phase variation of the reflected pulses with respect to the reference voltage, due to pulse reflection time, without any effect on the control system.

Also connected in the cathode circuit of tube 92 is the usual cathode-follower resistor 105 and by-pass condenser 106. The values of the various circuit constants are so chosen that tube 92 is completely blocked except during the flat-top portion of the voltage $\phi_2$. Since, in the illustration used, the left azimuth pulses occur during this interval, it will be clear that the output voltage derived across resistor 105 and appearing on lead 68 will correspond only to the left azimuth pulses, all the remaining pulses being blocked out by the negative bias supplied by resistor 98 during the remaining portions of the cycle of voltage $\phi_2$.

The use of the diode 103 is necessary in order to assure that during the occurrence of the pulses to be transmitted, the tube will maintain constant translating characteristics, so that the pulse will be properly transmitted thereby.

In the same manner, tube 92', having a circuit identical with tube 92, acts as the right azimuth keyer 36. In this instance, however, the phase of the voltage $\phi_2$ applied to tube 92' is opposite from that of tube 92 resulting in the transmission only of the right azimuth pulses. The corresponding elements of the right keyer are given the same reference number as for the left keyer, but primed.

The voltages thus appearing on the outputs 68, 69 of the device of Fig. 8 may then be utilized as in Fig. 7, or as in Fig. 3.

Fig. 9 shows the application of the tracking device of the preceding figures to gun control apparatus. In this instance, the receiving antenna arrangement 14 is mounted together with a gun 81, in such a manner that the spin axis 18 of the receiving arrangement 14 is parallel to the axis of the gun 81. The circuits of the present embodiment are similar to those of Fig. 7, but showing the control along both coordinates, that is, along elevation in addition to azimuth. In this embodiment, however, only a single antenna arrangement 14 is utilized, both for transmitting and receiving. Thus, the transmitter 11 is connected directly to the antenna 14 and the receiver 27 is coupled thereto by a T-R box 82. T-R box 82 serves to block the receiver 27 as to the transmitted pulses, but to permit passage thereto of the received pulses. Such devices are shown in copending application, Serial No. 466,530 for Ultra High Frequency Devices, filed November 20, 1942, in the names of W. L. Barrow et al., and assigned to the same assignee as the present case, which application matured into U. S. Patent No. 2,454,761 on November 30, 1948. The output of receiver 27 is then supplied to the various pulse keyer devices 33, 34, 35 and 36 in a fashion similar to that shown in Fig. 3 or 7, whereby these keyers pass only the corresponding pulses.

Considering for the moment only the azimuth control, these pulses are then supplied to the condenser arrangement 73—74 similar to that shown in Fig. 7, whose output is connected through the amplifier 46" to control the servo 47, which is geared to the differential 49 whose output shaft 51 actuates condenser arrangement 73—74. A memory generator 66 is also geared to servo 47, and its output across leads 130 is supplied to azimuth amplifier 46", which in the present instance incorporates the circuits of amplifier 46 and of amplifier 46' as well as resistor 63 and condenser 64 of Fig. 7. The mount is actuated from a manual control 53 in the same manner as in Figs. 3 and 5.

The device as thus far described is identical with that of the preceding figures. In order to supply the proper prediction lead angle for the gun 81 to allow for motion of the target during the flight of the projectile, condenser arrangement 73, 74 is mounted on a rotatable platform or member 83 which offsets the neutral or zero point of the condenser arrangement by the amount of the desired prediction lead angle. This lead angle is proportional to the product of the time of flight of the projectile by the angular velocity of the target. The voltage output of generator 66, as has been described, is proportional to the target angular velocity. The time of flight of the projectile may be taken as substantially proportional to the range of the target, which may be derived from a suitable range circuit 55 similar to that described in the above-mentioned application Serial No. 452,818, now U. S. Patent No. 2,542,032, and adapted to produce a voltage proportional to the target range.

A suitable electronic or other voltage multiplier 86 of any conventional type may be utilized to produce a prediction voltage in its output 87 proportional to the product of the range voltage produced by circuit 55 by the target angular rate voltage produced by generator 66. This prediction voltage then correspondingly displaces the output of a prediction motor 88 geared to member 83. A repeat-back connection (not shown) may be provided to assure that the output displacement of motor 88 corresponds to the output voltage of multiplier 86.

Accordingly, the present system offsets the electrical axis or equi-signal axis of the apparatus according to the prediction lead angle, whereby, when the target is being accurately tracked, that is, being tracked in such manner that zero voltage appears in the input of amplifier 46" and indicator 70 is at zero deflection, the gun will be properly directed to fire a projectile at the target.

In operation, the gunner will actuate the manual control 53 to maintain the indicator 70 aligned with its neutral or zero mark 80, in which case the gun will be accurately oriented.

It will be understood that the mounting arrangement for this modification is identical to the prior modifications described. In this case, however, a gun is added and is fixedly mounted with respect to that portion of the apparatus which controls the orientation of spin axis 18 so that the axis of the gun barrel is always necessarily parallel to the spin axis 18. Thus the positions of the elevation and azimuth control handwheels alone determine the orientation of both spin axis 18 and that of the gun axis.

The elevation control for the gun is exactly similar to that of the azimuth control just described, operating from the up and down elevation pulses derived from keyers 33 and 34 and need not be further described at this time. Actuation of the elevation manual control rotates reflector 14, spin axis 18, gun 81, motor 19 and generator 26, together in elevation with respect to the remainder of the apparatus, which in turn may be rotated in azimuth with respect to ground by actuation of azimuth control handwheel 53. In addition, as previously pointed out, motor 19 causes reflector 14 to continuously rotate about spin axis 18 through the interconnecting shaft.

In addition to the prediction lead angle discussed above, ballistic corrections may also be made. Thus, by deriving a voltage proportional to the required ballistic lead angle, and by inserting this voltage in series with the output 87 of multiplier 86, the condenser mount 83 may be additionally offset so that the complete lead angle, including both prediction and ballistic corrections, is set in.

It will be seen that in this system of Fig. 9, the target rate is obtained as the rate of motion of servo 47. This measure of target rate is not affected by small variations in the actuation of manual control 53. In this way the instability problem arising in the usual "disturbed" sight, in which target rate is derived from the angular velocity of the mount, is substantially reduced, since here the target rate is not generated by the motion of the mount.

Also, here the error indicated by indicator 70 is with respect to the future gun position, so that the gunner responds directly to the required gun orientation.

Fig. 10 shows a modified apparatus for segregating the respective elevation and azimuth pulses whose waves are shown in Fig. 4 (curves C through F), and which may be utilized in place of the portions of the apparatus of Figs. 3, 5, 6, 7 and 9 having similar functions.

In Fig. 10, a single antenna arangement 14' is shown which is utilized both for transmitting and receiving, as described with respect to Fig. 9. The directivity pattern 16 of this antenna arrangement is rotated as before by means of a motor 19 through suitable gearing. The wave reflected from the distant object and received by the antenna arrangement 14 is then led to a suitable commutating arrangement 121, schematically shown as comprising a rotating contact 122 and a plurality of stationary sectoral contacts 123a, 123b, 123c and 123d. The commutator 121 has its arm 122 rotated by means of motor 19 in synchronism with the rotation of the directivity pattern 16, and its phase of rotation is so adjusted that at the instant a pulse is transmitted the rotating arm 122 makes contact with one of the contactors 123. For example, when contacting contact 123a, the up elevation pulse may be transmitted. Each of the contactors 123 is then connected to a respective receiver, such as receivers 124a, 124b, 124c and 124d which are adapted to demodulate the high frequency wave input thereto and to derive the modulation envelope thereof.

In this manner, the various pulses are segregated before detection, so that the outputs of the receivers 124 will contain only the respective pulses, which may be utilized in the manner described in any of the preceding figures to provide the corrected data transmission system or the improved gun control system of the invention.

If it is desired or necessary to produce the range voltage or indication described with respect to the preceding figures, this may be done by combining the outputs of the four receivers 124 in a suitable combining circuit 126 to produce in its output 127 a wave corresponding to that of Fig. 4 (curve B), which may be utilized to produce a suitable range voltage or indication as described above.

As a further modification, it is noted that, where the commutating arrangement of Fig. 10 is used, the transmitted wave need not be periodically pulsed, but may be a random pulse wave or continuous unmodulated wave, since the required synchronous pulsing is produced by the commutator at the receiver. In this case, the length of each of the segments 123, or the transmission duration at each position of the commutator, should be very short compared to the complete cycle of commutation.

Fig. 11 shows another arrangement of the transmitting and receiving apparatus which overcomes some of the difficulties inherent in the systems above. In the systems of the previous figures, it will be noted that the output of two-phase generator 26 is synchronized with the transmitted pulses. However, the pulses received after reflection from a distant object will be delayed in time with respect to these transmitted pulses by an amount proportional to the range of the reflecting distant object. In this way, the received wave, such as wave 25 in Fig. 4 (curve B), will contain pulses having a changing phase with respect to the reference voltages shown in Fig. 4 (curves G and H), this changing phase being dependent upon the range of the reflecting object. The effect of such shifting phase may be minimized when using the circuit of Fig. 8, by causing the detectors 103, 103' of that figure to provide a relatively broad, flat top in the keying voltages applied to tubes 92 and 92'. However, when other types of keyers are used, and especially in the apparatus of Fig. 6, wherein detectors are utilized, and in the apparatus of the above-mentioned copending application Serial No. 452,818, now U. S. Patent No. 2,542,032, such a shifting phase in the received pulses creates difficulties and may cause the indication produced to be in error by as much as 3°. Where accurate results are required, as in fire control work, such errors are inadmissible, and recourse may be had to the circuit of Fig. 11 to overcome this defect.

In the circuit of Fig. 11, the control oscillator 20 synchronizes the pulse transmitter 11 to produce the same type of periodic pulse radiated wave as in the preceding figures, as shown in Fig. 4 (curve A). The receiving antenna arrangement 14 is rotated by motor 19, which is also synchronized with the transmitted pulses by means of its connection to control oscillator 20 in the manner shown in Fig. 6. Also synchronized with control oscillator 20 is a range pulse generator 111, which produces in its output a periodic pulse wave of the same periodicity as the envelope of the wave derived from transmitter 11, and hence the same as that of the received wave produced by the receiver and detector 27, but shifted in phase by an amount made adjustable under the control of a suitable manual range tracking control member 114. This wave may be as shown in Fig. 4 (curve I).

The output of receiver 27 and of range pulse generator 111 are fed to a pulse gate 112 which transmits to its output 113 only that portion of output receiver 27 which occurs simultaneously with the pulses produced by the range pulse generator 111, whereby extraneous noise effects are minimized. The circuits of such a range pulse generator and pulse gate are described in detail in the above-mentioned copending application Serial No. 452,818, now U. S. Patent No. 2,542,032, and are believed to require no further explanation here. In operation, the tracking control operator actuates control member 114 to maintain the range pulses output from generator 111 coincident in phase with the reflected pulses produced in the output of receiver 27, as indicated on a suitable indicator, shown in the last-mentioned copending application, whereby the pulse gate 112 will pass these pulses. Since in this manner the pulses output from range pulse generator 111 are maintained in phase synchronism with the receiver output, they may be utilized to synchronize the output of a two-phase generator 26' to produce the reference voltages $\phi_1$ and $\phi_2$ described above, but now synchronized in phase with respect to the received wave of Fig. 4 (curve B) rather than the transmitted wave of Fig. 4 (curve A). In this manner, errors due to rotation of the reflecting arrangement 14 during the reflection time of the transmitted pulses, are overcome, and the apparatus is rendered independent of the range of the distant object.

The outputs of pulse gate 112 and two-phase generator 26' are then connected to the corrected data system of any of the preceding figures, to operate as described below. In this way, the system of Fig. 11 may be substituted for the equivalent circuits of any of the preceding figures.

In above Figs. 1, 3, 5, 6 and 7, the system of the invention has been described as using a fixed, preferably slightly broadly directional transmitting antenna and a rotating highly directional receiving antenna 14. This arrangement in any of these modifications may be utilized interchangeably with a single rotating antenna arrangement as shown in Fig. 9 or 10, in which both transmission and reception is effected, the respective high frequency waves being segregated by means of a T-R box as described above.

Furthermore, if desired, the transmitting antenna arrangement 13 could be made rotating in the manner previously described with respect to the receiving antenna 14, in which case the receiving antenna 14 would then be fixed. Alternatively both antennae could be made rotating in synchronism. The only necessary criterion is that the overall system directivity pattern, which may be considered to be formed as the product of the individual transmitting and receiving directivity patterns, shall be as shown in Fig. 2, namely, having four periodically repeating positions about spin axis 18. With any of these modifications, the operation of the systems described remains unchanged.

While the above systems have been described specifically with respect to four pulses per revolution of the antenna arrangement, (transmitting, receiving, or both) the pulses recurring respectively at the extreme positions of the directivity pattern in elevation and azimuth, it is to be understood that many other types of operation are possible.

In the systems described above, tracking deviations in azimuth are obtained with respect to a vertical reference plane containing spin axis 18, and deviations in elevation are obtained with respect to a horizontal reference plane also containing the spin axis 18. In place of these two reference planes, any other pair of independent (that is, non-coincident or non-parallel) reference planes, intersecting along spin axis 18 may be utilized. For example, the phase of the rotation of the antenna directivity pattern with respect to the transmitted pulses may be different from that described above, so that the respective alternate pulses corresponding for example, to the azimuth pulses described above, will not be transmitted at instants at which the directivity axes 17 lie in the same horizontal plane, but rather at instants at which these axes 17 lie in a slant plane passing through spin axis 18. In such a case, the former azimuth control system and indicating system will be operative with respect to deviations with respect to a new reference plane perpendicular to this slant plane and passing through spin axis 18. Similarly, the former elevation control system will now be operative with respect to a second new reference plane perpendicular to the first new reference plane and also passing through spin axis 18. This may be done without in any way impairing the usefulness of the present invention.

In addition, the pulses transmitted need not be equally spaced in time or synchronized with the antenna rotation, so long as many pulses per revolution are transmitted. If desired, any four pulses could be utilized. In such a case, any two pairs of these pulses could be utilized in place of the elevation and azimuth pulses described above, so long as the reference planes defined by the points of equal intensity of the antenna directivity patterns during the instances that these pulses are transmitted are not coincident or parallel, and intersect along spin axis 18.

It will be clear also that in such a case the pair of pulses utilized for control along one coordinate need not be transmitted at diametrically opposite positions of the directivity pattern but may be transmitted at any suitable points of the cycle of rotation of the directivity pattern. These pulses need not be alternate, but may be successive.

Furthermore, more than four pulses per revolution may be utilized. Thus, any integral number of pulses per revolution are suitable, in which case any two pairs of these pulses may be chosen for providing control or indication so long as the equi-signal or reference planes thereby defined are independent and intersect along axis 18. With the modification of Fig. 10, the pulse waves need not even be periodic.

It is to be understood that in any of the above proposed modifications, the respective pulses whether equally spaced or unequally spaced, whether diametrically opposed or not, may be segregated as desired, by means of a commutating arrangement such as in Fig. 10 or by suitable keyers as described above, for which the reference voltages must conform in their relative phases to the relative phases of the pulses with respect to the cycle of rotation of the directivity pattern.

It will be seen that the systems disclosed in the present invention depend for their operation essentially upon the transmission and reception of separate sets of pulses with differing directivities. Thus, the pulses 21, 22, 23, 24 of Fig. 4 (curves A and B) may be considered to be four separate sets of pulses suitably segregated at the receiver. Other means for insuring separation of these sets of pulses may also be used, such as transmission of the different sets at respectively different carrier or sub-carrier frequencies to be separated at the receiver on the basis of frequency rather than time as in the illustrations used. Separation on the basis of amplitude may also be effected.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for determining the orientation of a distant object, comprising means for transmitting a sequence of periodic pulses of high frequency radiant energy, means for receiving said pulses after reflection from said object, said receiving means having a highly directional receptivity pattern, and including means for continuously rotating said pattern about a spin axis offset from the axis of maximum receptivity thereof, means for segregating those of said pulses received during respective different positions of said receptivity pattern, first, second and third members, means interconnecting said members for displacing said first member in accordance with the difference between the displacements of said second and third members, means responsive to the position of said first member for differentially modifying the amplitudes of said respective pulses, motive means responsive to the relative amplitudes of said modified pulses for driving said third member, and means for positioning said second member in accordance with the orientation of said spin axis.

2. Apparatus for determining the orientation of a distant object, comprising means for transmitting a sequence of periodically recurring pulses of high frequency radiant energy, means for receiving said pulses after reflection from said object, at least one of said means having a periodically varying directivity pattern having two different positions forming an equi-signal axis, means for separating pulses received during said two different positions of said pattern, a movable member, and means for positioning said member in accordance with the ratio of the amplitudes of said two sets of pulses.

3. Apparatus for determining the orientation of a distant object, comprising means for transmitting a sequence of periodically recurring pulses of high frequency radiant energy, means for receiving said pulses after reflection from said object, at least one of said means having a periodically varying directivity pattern having two different positions forming an equi-signal axis, means for separating pulses received during said two different positions of said pattern into two respective sets, respective circuit means energized by said respective sets, means for differentially varying the sensitivity of said circuit means to said two sets of pulses in accordance with the relation between the intensities of the pulses of said two sets, means for adjusting said axis to track with said object, an output member, and means for controlling said output member in accordance with the orientation of said axis and said sensitivity variation, to maintain said member in correspondence with the orientation of said object independently of variations in the orientation of said axis at least for a limited range.

4. Apparatus as in claim 3 further including means responsive to said variation in sensitivity for adjusting the orientation of said axis to reduce the difference between said pulse intensities.

5. Apparatus for determining the orientation of a distant object, comprising means for transmitting a wave of periodically recurring pulses of high frequency radiant energy, means for receiving said pulses after reflection from said object, at least one of said means having a periodically varying directivity pattern having two different positions forming an equi-signal axis, means for separating the pulses of said wave received during said positions of said directivity pattern to form two sets of pulses, respective circuit means energized by said separated sets of pulses, means for differentially varying the sensitivity of said circuit means to said two sets of separated pulses in accordance with the ratio of the difference in the intensity of said respective pulse sets to the sum of these intensities, means for varying the orientation of said axis to track with said object, an output member, and means for controlling said output member in accordance with both the orientation of said axis and said sensitivity variation to maintain said member in correspondence with the said object orientation independently of variation of said axis orientation at least for a limited range.

6. Apparatus as in claim 5 wherein said sensitivity varying means comprises a pair of capacitances simultaneously variable to maintain constant additive capacitance, each of said pulse waves being supplied to a respective one of said capacitances, and means for adjusting said capacitances to maintain equal voltages thereacross.

7. Apparatus as in claim 5 further including means responsive to said variation in sensitivity for controlling said axis-orientation - varying means to reduce said ratio.

8. Apparatus for determining the orientation of a distant object, comprising means for transmitting a sequence of pulses of high frequency radiant energy, means for receiving said pulses after reflection from said object, at least one of said means having a periodically varying directivity pattern having two different positions forming an equi-signal axis, means for separating pulses received during said two different positions of said pattern into two respective sets of pulses, respective circuit means energized by said respective sets of pulses, means for differentially varying the sensitivity of said circuit means to said two sets of pulses in accordance with the relation between the intensities of the pulses of said two sets, and means for controlling an output member in accordance with said sensitivity variation to maintain said member in correspondence with the orientation of said object.

9. Apparatus as in claim 8, wherein said sensitivity varying means is responsive to the ratio of the difference in the intensities of said respective pulse sets to the sum of these intensities.

10. Apparatus as in claim 8, wherein said circuit means comprises a pair of capacitances simultaneously variable to maintain constant additive capacitance, each of said pulse sets being supplied to a respective one of said capacitances and wherein said sensitivity varying means include means for adjusting said capacitances to maintain equal voltages thereacross and for simultaneously adjusting said output member.

11. Apparatus as in claim 8, wherein said last-named means includes means for rendering the position of said output member independent of variation in the position of said axis.

12. Apparatus for determining the orientation of a distant object, comprising means for transmitting two periodically recurring pulse waves of high frequency radiant energy, means for receiving one of said pulse waves after reflection from said object and in accordance with a predetermined directive receptivity pattern, means for similarly receiving the other of pulse waves in accordance with a different directive receptivity pattern overlapping said first pattern to form an axis of equal receptivity, means for physically adjusting the orientation of said axis, an adjustable output member, and means for actuating said member in accordance with the angular displacement of said axis from a predetermined datum position and the ratio of the amplitudes of said respective pulse waves to set said member in accordance with the true orientation of said object, independently of variations of said axis orientation.

13. Apparatus for determining the orientation of a distant object, comprising means for transmitting two waves of periodically recurring pulses of high frequency radiant energy, means for receiving said two pulse waves after reflection from said object, said transmitting and receiving means having a combined overall directivity pattern for one of said pulse waves different from and overlapping that for the other of said waves to form an equi-signal axis, axis orientation adjusting means controlled by the receiving means for maintaining said axis in close alignment with the object, an output member positioned by the last-mentioned means in accordance with the position of the axis, means displaced by the last-mentioned means in accordance with the relation between the amplitudes of the respective pulse waves and the axis position for more accurately aligning the axis with the object and thereby more accurately positioning the output member.

14. Apparatus as in claim 13 wherein said axis orientation adjusting means comprises servo means responsive to the ratio of the amplitudes of said received pulse waves for adjusting the orientation of said axis to reduce said difference.

15. Apparatus for determining the orientation of a distant object, comprising means for transmitting two waves of periodically recurrent pulses of high frequency radiant energy, means for receiving said waves after reflection from said object, said transmitting and receiving means having a combined overall directivity pattern for one of said waves different from and overlapping that for the other of said waves to form an equi-signal axis, means for adjusting the orientation of said axis, an output member, and means for actuating said member in accordance with the angular position of said axis and in accordance with the ratio of the difference between the amplitudes of said respective pulse waves to the sum of these amplitudes to maintain said member in correspondence with the orientation of said object independently of variation of said axis orientation at least over a limited range.

16. Apparatus as in claim 15 wherein said output member actuating means comprises a pair of capacitive voltage dividers each formed of a fixed capacitance and a variable capacitance, said variable capacitances being simultaneously variable to maintain constant additive capacitance, means for impressing each of said pulse waves across a respective one of said voltage dividers, and means for adjusting said capacitances to maintain equal voltages thereacross.

17. Apparatus for determining the orientation of a source of high frequency energy, comprising a directive antenna arrangement having a highly directive axis of maximum receptivity, means for rotating said arrangement about a spin axis angularly disposed with respect to said directivity axis, whereby said spin axis forms an equi-signal axis with respect to two different positions of said pattern during said rotation, means for separating energy received during said two different positions to form two respective received waves, respective circuit means energized by said respective waves, each of said circuit means comprising a fixed condenser in series with a variable condenser, means for simultaneously varying said variable condensers to maintain constant additive capacitance thereof, an output member, and means for simultaneously actuating said output member and said variable condenser combination in a manner to maintain equal voltages across said variable condensers, whereby said output member is maintained in correspondence with the orientation of said source.

18. Apparatus for determining the orientation of a source of high frequency energy, comprising means for receiving said energy according to two different and overlapping directivity patterns, means for separating energy received according to said two patterns to form two respective received waves, respective circuit means energized by said respective waves, means for differentially varying the sensitivities of said circuit means to said two waves in accordance with the ratio of the difference in the amplitudes of said waves to the sum of these amplitudes, an output member, and means for controlling said output member in accordance with said sensitivity variation to maintain said member in correspondence with the orientation of said source.

19. Apparatus for determining the orientation of a source of high frequency energy, comprising means for receiving said energy in accordance with two different and overlapping directivity patterns, means for separating the energy received according to said two different patterns to form two respective received waves, an output member, and means for controlling said output member in accordance with the ratio of the difference between the amplitudes of said waves to the sum thereof, whereby said member is maintained in correspondence with the orientation of said source.

20. Apparatus for determining the orientation of a source of high frequency energy, comprising means for receiving said energy in accordance with two different and overlapping directivity patterns, means for separating energy received in accordance with said respective patterns to form respective received waves, respective circuit means energized by said respective waves, means for differentially varying the sensitivities of said circuit means in accordance with the relation between the amplitudes of said received waves, and means responsive to said sensitivity variation for indicating the orientation of said source.

21. Apparatus, as claimed in claim 1, wherein said pulse modifying means comprises a pair of series connected potentiometers having the respective segregated pulse waves applied respectively thereacross, a pair of fixedly related sliders for said potentiometers and fixed to said first member, and means for extracting the voltage between said sliders.

22. Apparatus for determining the orientation of a distant object, comprising means for transmitting two waves of high frequency radiant energy, means for receiving said two waves after reflection from said object, said last two means having a combined overall directivity pattern for one of said waves different from and overlapping that for the other of said waves to form an equi-signal axis, an output member, means for actuating said member in accordance with the relation between the amplitude of said respective waves to set said member in accordance with true orientation of said object, and means for rendering the position of said member independent of variations in position of said axis.

23. Apparatus for determining the orientation of a distant object, comprising means for transmitting two waves of high frequency radiant energy, means for receiving said two waves after reflection from said object, said last two means having a combined overall directivity pattern for one of said waves different from and overlapping that for the other of said waves to form an equi-signal axis, an output member, and means for actuating said member in accordance with the ratio of the difference between the amplitudes of said waves to the sum of said amplitudes.

24. Apparatus for determining the orientation of a distant object, comprising means for transmitting two waves of high frequency radiant energy, means for receiving said two waves after reflection from said object, said last two means having a combined overall directivity pattern for one of said waves different from and overlapping that for the other of said waves to form an equi-signal axis, an output member, means for actuating said output member in accordance with the ratio of the difference between the amplitudes of said waves to their sum, and means for rendering the position of said member independent of variations in the position of said axis.

25. Apparatus for determining the orientation of a distant object, comprising means for transmitting two waves of high frequency radiant energy, means for receiving said two waves after reflection from said object, said last two means having a combined overall directivity pattern for one of said waves different from and overlapping that for the other of said waves to form an equi-signal axis, an output member, a pair of circuits energized respectively by said respective waves, means for adjusting the relative sensitivities of said circuits to provide equal outputs therefrom, and means for actuating said output member in accordance with said sensitivity variations.

26. Apparatus for determining the orientation of a distant object, comprising means for transmitting two waves of high frequency radiant energy, means for receiving said two waves after reflection from said object, said two means having a combined overall directivity pattern for one of said waves different from and overlapping that for the other of said waves to form an equi-signal axis, an output member, a pair of capacitances simultaneously variable to maintain constant additive capacitance, means for supplying each of said waves to a respective one of said capacitances, means for adjusting said capacitances to maintain equal voltage thereacross, and means for actuating said output member in response to said last-named adjusting means in accordance with said adjustment.

27. Radio gun control apparatus comprising means for transmitting a sequence of periodically recurring pulses of high frequency radiant energy, means for receiving said pulses after reflection from a target, means for periodically moving at least one of said means into two different angular positions to form an equi-signal axis midway between said positions, means for maintaining the orientation of a gun parallel with said equi-signal axis, means for separating pulses received during said two different positions to form two sets of pulses, means responsive to said pulses for obtaining an electrical measure of the ratio of the difference of the amplitudes of said sets to the sum thereof, means for computing the lead angle required between the gun orientation and the target orientation for effective gunfire, and motive means responsive to said last two named means for driving the gun and the means which defines the equi-signal axis until the measure of said ratio is equal to said lead angle.

28. In a radio apparatus for fire control, a receiving antenna having a directivity axis, means for maintaining a gun aligned with said axis, the antenna and gun being movable together for target tracking purposes, a receiver for receiving from the antenna signals reflected from the target being tracked, indicating means controlled by the output of the receiver for providing data as to the relationship of the antenna axis and the direction to the target, means for bringing the antenna axis and gun into alignment with the target in accordance with said data, lead-angle-computing means including range measuring means, and means for altering said data in accordance with a lead angle whereby when the antenna and gun appear aligned with the target according to the data, both are actually offset therefrom according to a lead angle.

29. In a radio apparatus for fire control, a receiving antenna having a directivity axis, means for maintaining a gun aligned with said axis, both antenna and gun being movable together for target tracking purposes, a receiver for receiving from the antenna signals reflected from the target being tracked, keying means controlled by the receiver output for providing impulses varying in relative values in accordance with relative displacement of the antenna axis and the direction to the target, range measuring means, means for causing the antenna to track the target, means for measuring the angular rate of the target, lead angle computing means including a multiplying device controlled jointly by the last-mentioned means and the range means, and means controlled by said computing means for modifying the impulses from the keying means according to the lead angle at which the gun must be positioned in order to intercept the target being tracked.

30. In a radio apparatus for fire control, a receiving antenna having a directional axis movable for target tracking purposes, a receiver for receiving from the antenna signals reflected from the target being tracked, means controlled by the receiver for providing an output indicating relative displacement of antenna axis and the direction to the target whereby the antenna axis may be kept positioned on the target, said means comprising keying means controlled by the receiver output for providing impulses varying in relative values in accordance with the relative displacement of the antenna axis and said target direction, range measuring means, means for causing the antenna to track the target, means for measuring the angular rate of the target, lead angle computing means including a multiplying device controlled jointly by the last-mentioned means and the range measuring means, and means controlled by said computing means for modifying the impulses from the keying means according to the computed lead angle, whereby the indication provided by said output will indicate on-target when the antenna is angularly offset therefrom through said lead angle.

31. Radio gun control apparatus comprising means for transmitting a sequence of periodically recurring pulses of high frequency radiant energy, means for receiving said pulses after reflection from a target, means for periodically moving at least one of said means into two different angular positions to form an equi-signal axis, means for maintaining the orientation of a gun parallel with said equi-signal axis, computing means for supplying a measure of the lead angle required between gun orientation and the target for effective gun fire, means for separating the pulses received respectively during said two different positions to provide two signals, and means controlled by said computing means and said signals for providing a measure of the algebraic sum of the angle between said equi-signal axis and the direction of the target and said lead angle.

32. Radio gun control apparatus comprising means for transmitting a sequence of periodically recurring pulses of high frequency radiant energy, means for receiving said pulses after reflection from a target, means for periodically moving at least one of said means into two different angular positions to form an equi-signal axis, means for maintaining the orientation of a gun parallel with said equi-signal axis, computing means for supplying as an output a measure of the lead angle required between gun orientation and the target for effective gun fire, means for separating the pulses received respectively during the said two different positions to provide two signals, means for indicating the ratio of the difference of the amplitude of said signals to the sum thereof, and means controlled by the output of said computing means for differentially modifying the amplitudes of said signals by an amount sufficient to effect an indication proportional to the required lead angle of said gun for effective gun fire whereby, when said axis is oriented to maintain said indication at zero, said gun is oriented to lead the target by the required lead angle for target interception purposes.

33. Radio gun control apparatus comprising means for transmitting a sequence of periodically recurring pulses of high frequency radiant energy, means for receiving said pulses after reflection from a target, means for periodically moving at least one of said means into two different angular positions to form an equi-signal axis, means for maintaining the orientation of a gun parallel with said equi-signal axis, means for separating the pulses received respectively during said two different positions to provide two signals, and means for orienting said equi-signal axis with respect to said target so as to produce a ratio of the difference of the amplitudes of said two signals to the sum thereof proportional to a lead angle, whereby to orient said gun with said lead angle for target interception purposes.

34. Radio gun control apparatus comprising means for transmitting a sequence of periodically recurring pulses of high frequency radiant energy, means for receiving said pulses after reflection from a target, means for periodically moving at least one of said means into two different angular positions to form an equi-signal axis, means for maintaining the orientation of a gun parallel with said equi-signal axis, computing means for supplying as an output a measure of the lead angle required between gun orientation and the target for effective gun fire, means for separating the pulses received respectively during said two different positions to provide two signals, means for indicating the ratio of the difference of the amplitudes of said signals to the sum thereof, means controlled by the output of said computing means for differentially modifying the amplitudes of said signals so as to effect an indication proportional to the computed lead angle as compared to zero indication when the amplitudes of the unmodified signals are equal, and means for orienting said axis to maintain said indication at zero whereby to provide said gun with the required lead angle for target interception purposes.

35. Radio gun control apparatus comprising radio object-locating means having an orientable directional axis, means for maintaining the orientation of a gun parallel with said axis, means for indicating angular difference in orientation between said axis and a distant target, means for supplying as an output a measure of the required lead angle between gun orientation and the target, and means controlled by the output of said last-mentioned means for biasing the action of said object-locating means so that the directional indication afforded by said indicating means is offset from the true indication by an angular amount proportional to said lead angle.

36. Apparatus for determining the orientation of a distant object comprising means for transmitting a sequence of pulses of high frequency radiant energy, means for receiving said pulses after reflection from a target, means for moving at least one of said means into two different angular positions to form an equi-signal axis representing the direction to a target when the pulses received during said two positions are equal, means for separating the pulses received respectively during said two different positions to form two signals, and means controlled by said two signals for providing a measure of the angular offset between the equi-signal axis and the direction to said target.

37. Apparatus for determining the orientation of a distant object comprising means for transmitting a sequence of pulses of high frequency radiant energy, means for receiving said pulses after reflection from a target, means for moving at least one of said means into two different angular positions to form an equi-signal axis representing the direction to a target when the pulses received during said two positions are equal, means for separating the pulses received respectively during said two different positions to form two signals, circuit means connected to receive said signals as inputs thereto, and means including a servo motor controlled by the outputs of said circuit means for equalizing said signal outputs, whereby to provide in the output of said servo a measure of the angular offset between the equi-signal axis and the direction to the target.

38. Radio gun control apparatus comprising an orientable, directive receiving antenna having a directional receptivity pattern, means for moving the receptivity pattern to two overlapping positions to define an equi-signal axis, means for maintaining the orientation of a gun parallel with said equi-signal axis, receiver means connected with said antenna, means for relatively varying the sensitivity of said receiver means for said two overlapping pattern positions whereby to change the direction of the equi-signal axis, and means for controlling said last mentioned means to effect an angular shift of said equi-signal axis by an amount equal to a desired gun lead angle; whereby, when the equi-signal axis tracks a target, the gun is correctly oriented by said lead angle for target interception purposes.

JOSEPH H. LANCOR, JR.
JOHN E. BINNS.

REFERENCES CITED

The following references are of record in the file of this patent:

UNITED STATES PATENTS

| Number | Name | Date |
| --- | --- | --- |
| 2,038,873 | Purington | Apr. 28, 1936 |
| 2,063,534 | Wallace | Dec. 8, 1936 |
| 2,116,717 | Scharlau | May 10, 1938 |
| 2,119,607 | Sterba | June 7, 1938 |
| 2,154,375 | Chambers | Apr. 11, 1939 |
| 2,171,561 | Hooven | Sept. 5, 1939 |
| 2,175,869 | Bernarde | Oct. 10, 1939 |
| 2,176,469 | Moueix | Oct. 17, 1939 |
| 2,182,950 | Steinhoff | Dec. 12, 1939 |
| 2,190,038 | Neufeld | Feb. 13, 1940 |
| 2,203,478 | Willis | June 4, 1940 |
| 2,218,477 | Parker et al. | Oct. 15, 1940 |
| 2,226,366 | Braden | Dec. 24, 1940 |
| 2,231,929 | Lyman | Feb. 18, 1941 |
| 2,285,540 | Stein et al. | June 9, 1942 |

FOREIGN PATENTS

| Number | Country | Date |
| --- | --- | --- |
| 764,537 | France | Mar. 5, 1934 |
| 555,052 | Great Britain | Aug. 3, 1943 |